(12) United States Patent
Johnston

(10) Patent No.: US 8,352,496 B2
(45) Date of Patent: Jan. 8, 2013

(54) ENTITY NAME MATCHING

(75) Inventor: Carolyn Johnston, Lafayette, CO (US)

(73) Assignee: Microsoft Corporation, Redmond, WA (US)

( * ) Notice: Subject to any disclaimer, the term of this patent is extended or adjusted under 35 U.S.C. 154(b) by 114 days.

(21) Appl. No.: 12/911,884

(22) Filed: Oct. 26, 2010

(65) Prior Publication Data

US 2012/0102057 A1 Apr. 26, 2012

(51) Int. Cl.
*G06F 17/30* (2006.01)

(52) U.S. Cl. ........................ 707/780; 707/706

(58) Field of Classification Search .......... 707/706–708, 707/755, 756, 758, 780
See application file for complete search history.

(56) References Cited

U.S. PATENT DOCUMENTS

| | | | |
|---|---|---|---|
| 5,819,291 A | 10/1998 | Haimowitz et al. | |
| 6,018,738 A * | 1/2000 | Breese et al. | 707/749 |
| 6,144,964 A * | 11/2000 | Breese et al. | 707/758 |
| 6,374,241 B1 | 4/2002 | Lamburt et al. | |
| 6,792,422 B1 | 9/2004 | Stride et al. | |
| 6,978,246 B1* | 12/2005 | Ruvolo et al. | 705/7.19 |
| 7,613,687 B2 | 11/2009 | Nye | |
| 7,644,070 B2 | 1/2010 | Hsieh et al. | |
| 7,647,344 B2 | 1/2010 | Skurtovich, Jr. et al. | |
| 8,117,237 B2* | 2/2012 | Benhadda et al. | 707/802 |
| 2002/0175948 A1* | 11/2002 | Nielsen et al. | 345/781 |
| 2003/0106043 A1* | 6/2003 | Bernadat et al. | 717/116 |
| 2005/0066059 A1* | 3/2005 | Zybura et al. | 709/248 |
| 2006/0212416 A1* | 9/2006 | Taylor et al. | 707/1 |
| 2007/0005593 A1* | 1/2007 | Self et al. | 707/6 |
| 2007/0100834 A1* | 5/2007 | Landry et al. | 707/10 |
| 2008/0301042 A1 | 12/2008 | Patzer | |
| 2009/0150212 A1* | 6/2009 | Steuben et al. | 705/10 |
| 2010/0094854 A1* | 4/2010 | Rouhani-Kalleh | 707/706 |
| 2010/0250598 A1* | 9/2010 | Brauer et al. | 707/780 |
| 2010/0293195 A1* | 11/2010 | Houghton | 707/776 |
| 2011/0238694 A1* | 9/2011 | Carlsson et al. | 707/769 |
| 2011/0264651 A1* | 10/2011 | Selvaraj et al. | 707/723 |

OTHER PUBLICATIONS

Madhavan, et al., "Generic Schema Matching with Cupid", Retrieved at << http://citeseerx.ist.psu.edu/viewdoc/download?doi=10.1.1.9.2432&rep=rep1&type=pdf >>, Proceedings of the 27th International Conference on Very Large Data Bases, Aug. 2001, pp. 15.

Rahm, et al., "A Survey of Approaches to Automatic Schema Matching", Retrieved at << http://blondie.cs.byu.edu/CS652/raham01survey.pdf >>, In the proceedings of The International Journal on Very Large Data Bases, vol. 10, Issue 4, Dec. 2001, p. 334-350.

* cited by examiner

*Primary Examiner* — Cam-Linh Nguyen
(74) *Attorney, Agent, or Firm* — Microsoft Corporation

(57) ABSTRACT

One or more techniques and/or systems are disclosed for matching entity names. A matching analysis is performed between a first entity name (e.g., business entity name) and a second entity name. The matching analysis comprises comparing a first entity category descriptor that has been amended into the first entity name with a second entity category descriptor that has been amended into the second entity name. If a match is identified in the category descriptors, the first and second entity names may comprise the same entity.

20 Claims, 9 Drawing Sheets

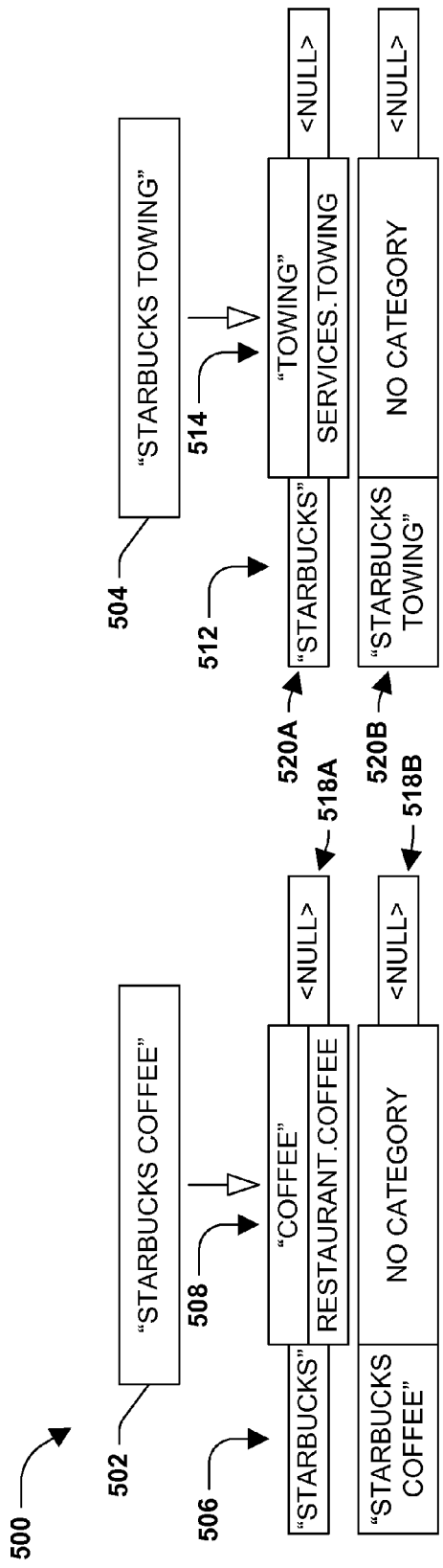
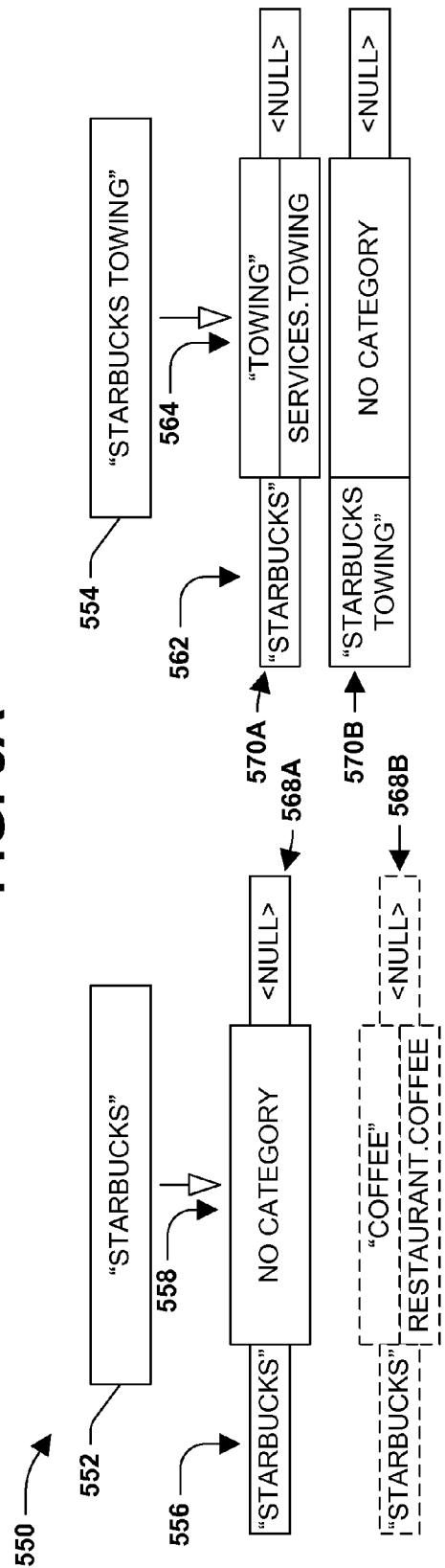
FIG. 5A
FIG. 5B

ENTITY NAME MATCHING

BACKGROUND

Online directories, such as commercial business listings (e.g., yellow pages), search-engine based directories, and others, allow an online user to search for and identify desired entities (e.g., local businesses to patronize). Further, online reviews can be submitted by hired experts, consumers, or other parties where the reviewer may mention the entity and describe their experience or opinion with the entity (e.g., a restaurant or product review). Additionally, bloggers, reporters, or other editorial persons may submit online information, stories, etc. about an entity, where the name of the entity is mentioned. However, often an entity name, such as a business, may not have uniform identity between two or more directories, blogs, reviews, or stories. For example, where the directory may identify a library as the Depot Street Library Branch in Medina, an online blog may merely refer to it as the Medina Branch Library. Further, there may be another entity of a different type that has a similar but confusing name, such as the Library Street Depot (e.g., a bar).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Matching entity names, such as business names in a directory or from multiple directories/locations, can be very important for record linkage systems that involve the entity names. Entity name matching can be a difficult problem that does not respond well either to merely a character-based or token-based approaches. Current or prior technologies attempt to match a name by matching the characters or tokens between the two (or more) names subjected to matching. That is, for example, a string matching algorithm is typically applied to two names, such as "Matt's Restaurant" and "Matt's Bar and Grill" to determine whether they may be a same entity.

Further, current or prior technologies attempt to match entity names using a completely knowledge-based approach. This technique does not typically work well either, due to the great amount of natural variation in business name mentions in various types of text. That is, for example, the name of the entity is matched against a database comprising a plurality of business names, and the associated business type. However, using merely this approach may require an enormous database, and, due to variations in how a name is used, may not provide adequate results.

Accordingly, one or more techniques and/or systems are disclosed that use a small knowledge base to extract entity category signals from an entity name mention (e.g., in a directory, blog, review, etc.), which can indicate a type of entity (e.g., business type, such as service, retail, food, etc.). Further, a string- or token-based matching approach can be used on the remainder of the entity name, for example, that is not part of the category signal. Utilizing this approach, a wide variety of types of entity name mentions can be matched, for example, from formal mentions in an online directory listing database, to casual business mentions in blog or review text, for example.

In one embodiment for matching entity names, a matching analysis is performed between a first entity name, such as a business name in a directory, and a second entity name, such as another business name from an online review. The matching analysis can comprise comparing a first entity category descriptor that has been amended into the first entity name with a second entity category descriptor that has been amended into the second entity name.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 5 illustrates one or more example embodiments where one or more techniques and/or systems are may be utilized.

DETAILED DESCRIPTION

Figure 1:
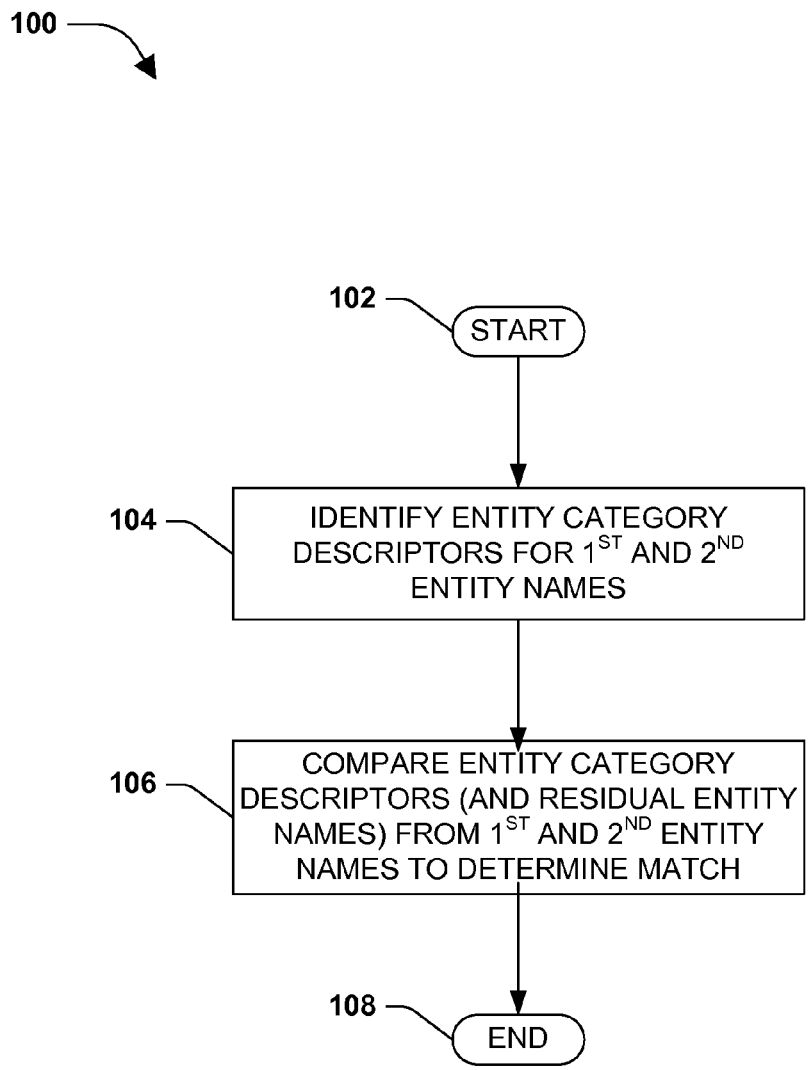
FIG. 1 is a flow diagram of an exemplary method for matching entity names.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Commonly, when searching for a particular entity online (e.g., on the Internet) a user can find multiple entries for a same entity, where respective entries comprise different variations of the entity name. For example, the user may wish to find a reputable auto mechanic by searching for user reviews online. In this example, using a first review site, the user may find that "Richardson's Quick Tire, Lube, and Auto Service" has a good rating. However, in a search for this entity, the user only finds "Richardson's Service" in an online directory. Without further investigation, the user may not know if these are the same entity, and an automated attempt (e.g., by an online directory, blog, or review site) to unify these two entity names may result in improper merging.

A method may be devised that provides for identifying multiple, names (e.g., as listings in one or more directories)

for a same entity, such as a business, so the multiple names may be linked together or merged to a single name, for example. FIG. 1 is a flow diagram of an exemplary method 100 for matching entity names. The exemplary method 100 begins at 102 and involves identifying a first entity category descriptor for at least a portion of the first entity name, and a second entity category descriptor for at least a portion of the second entity name, at 104.

A category descriptor can comprise a name of a category, which is descriptive of an entity type, where the entity type comprises a classification for an entity. As an illustrative example, a business-type category descriptor "restaurant" may represent a classification that includes a diner, grill, café, deli, sandwich shop, and many more. Further, a category descriptor "bar" may represent a classification that includes a bar, bar and grill, pub, lounge, inn, tavern, and many more.

Additionally, in one embodiment, a category descriptor may comprise a sub-category descriptor, where the sub-category comprises a classification of one or more entities that can also be classified by the category. For example, "restaurant.bar" may be a sub-category of "restaurant", and "retail.clothing" may be a sub-category of "retail". In one embodiment, the categories to which the category descriptors are associated may be arranged in a hierarchical tree. For example, where the root comprises "business entities", respective branches may comprise various categories that are types of business entities, such as services, manufacturing, retail, etc., for example.

In one embodiment, identifying a category descriptor for an entity name can comprise looking at one or more strings (e.g., words) in the entity name and identifying a category that matches the string. For example, in an entity name "Madoff Retirement Funds" the word "Funds" or even "Retirement Funds" may comprise an entity type related to financial planning services. Therefore, in this example, the category descriptor "services.financial-planning" may be identified for the entity name "Madoff Retirement Funds."

In one embodiment, a knowledge base (e.g., a database) may be used to facilitate in the identification of a category descriptor. For example, the string "Retirement Funds" may be compared against the knowledge base to determine that it is associated with the category "services-financial-planning." As a further example, the knowledge base may comprise a plurality of categories (e.g., associated in a hierarchical tree), where respective categories comprise a list of strings for particular entity names that may match to the category.

At 106 in the exemplary method 100, a matching analysis is performed between the first entity name and the second entity name. Here, the first entity category descriptor, which has been amended to the first entity name, is compared to the second entity category descriptor, which has been amended to the second entity name. In one embodiment, the category descriptor can be amended into the entity name, such that it is included in the name when the matching analysis is performed.

In one embodiment, the string that was used to identify the category descriptor can be replaced by the category descriptor in the entity name. For example, "Madoff Retirement Funds" may be amended to "Madoff <services.financial-planning>." In this embodiment, the first amended entity name and second amended entity name can be compared to determine whether there is a potential match between the two names. For example, "Madoff <services.financial-planning>" may be a match with "Maddoff <services.financial-planning>;" while "Madoff <services.towing>" is not likely to match "Madoff <services.financial-planning>."

Having performed the matching analysis, the exemplary method 100 ends at 108.

Figure 2:
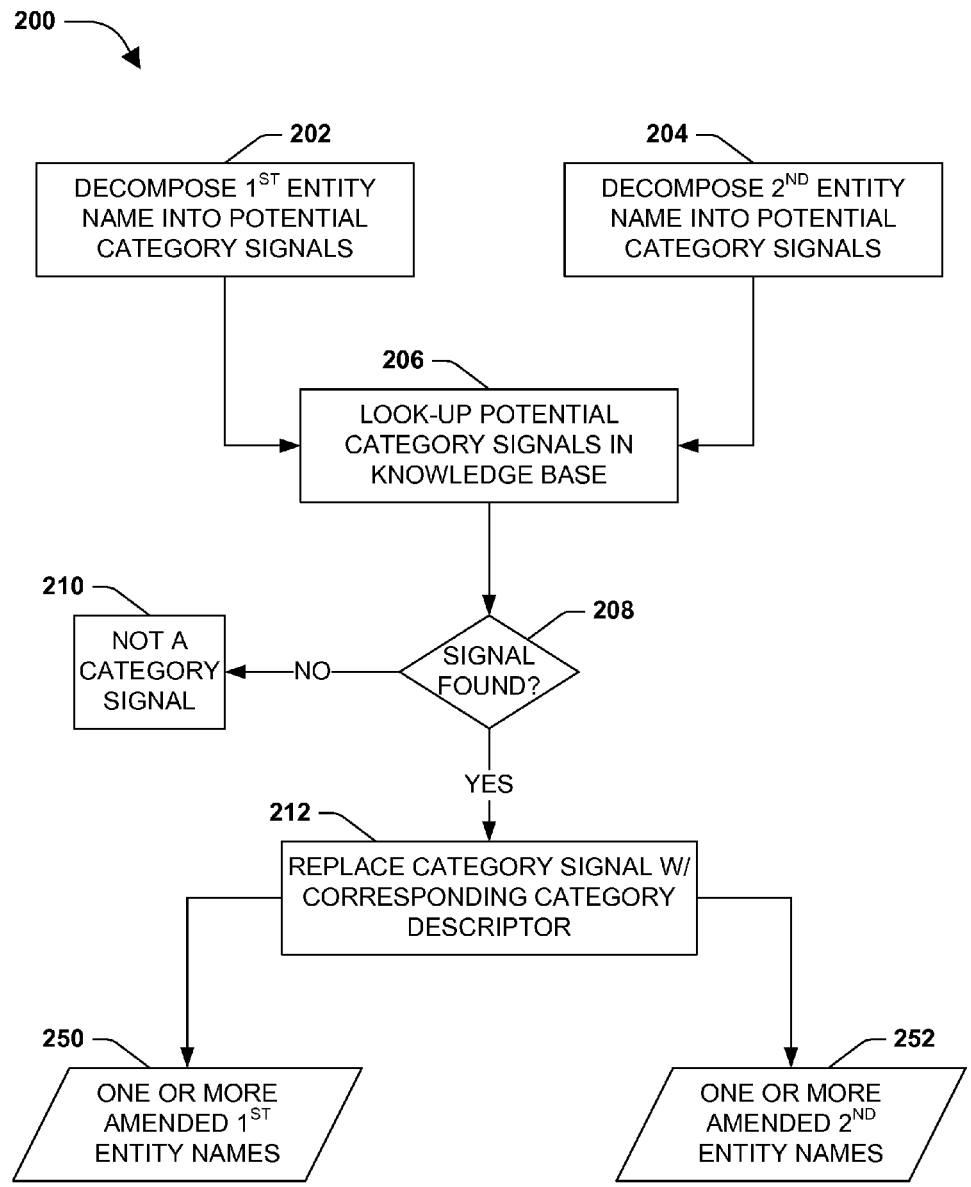
FIG. 2 is a flow diagram illustrating one embodiment of one or more portions of one or more methods described herein.
Figure 4:
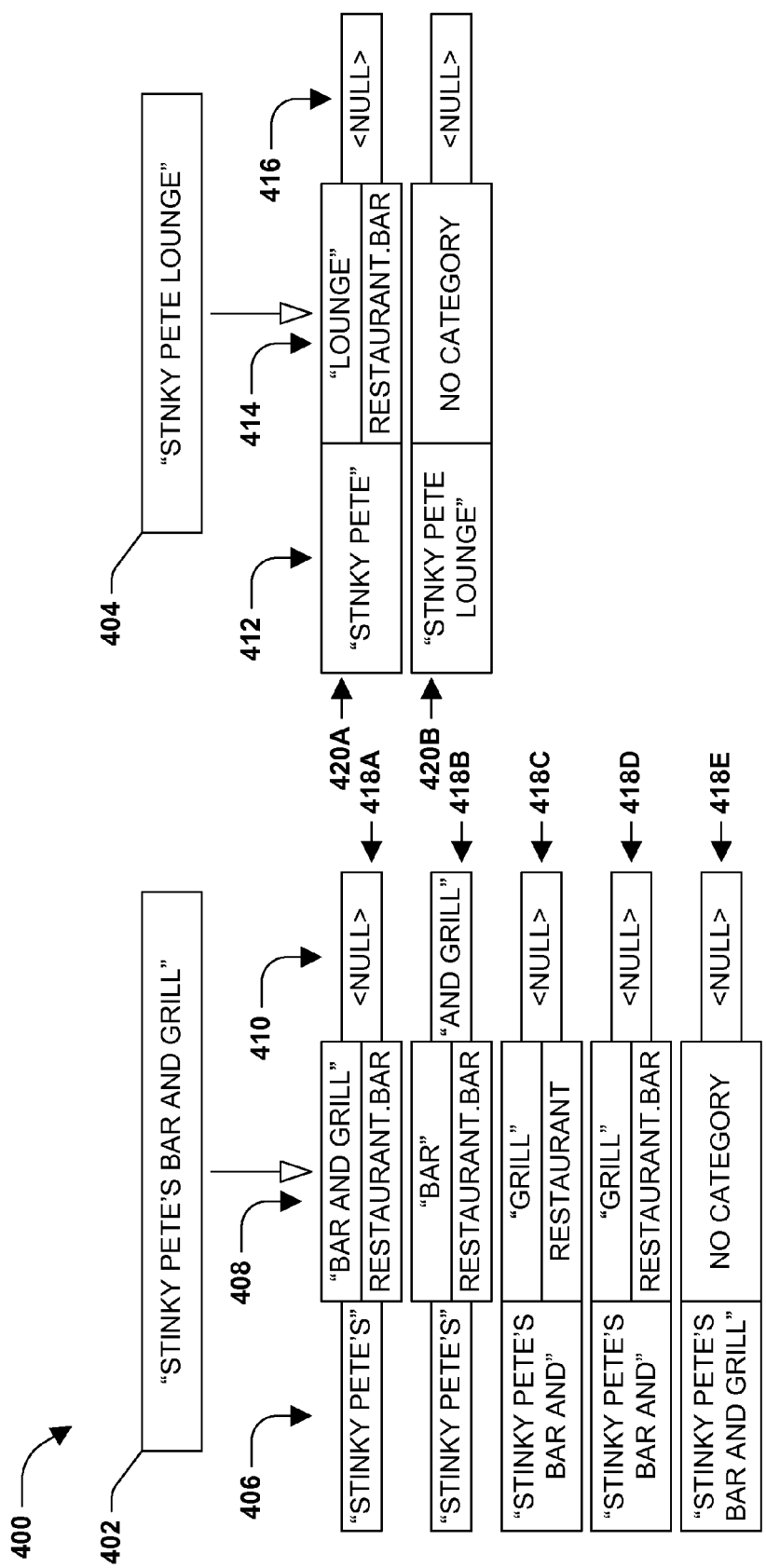
FIG. 4 illustrates one or more example embodiments where one or more techniques and/or systems are may be utilized.

FIG. 2 is a flow diagram illustrating one embodiment 200 of one or more portions of one or more methods described herein, where an entity name is amended. Reference will be made to FIG. 4, which is an illustration of one exemplary embodiment 400 of one or more techniques described herein. At 202, a first entity name is decomposed into potential category signals; and, at 204, a second entity name is decomposed into potential category signals. As an example, an entity name "Stinky Pete's Bar and Grill" may be decomposed into a plurality of potential category signals, such as: Stinky; Pete's; Stinky Pete's; Bar; Grill; and Bar and Grill; amongst others.

At 206 in the exemplary embodiment 200, respective category signals can be compared against a knowledge base, such as by looking to see if the knowledge base comprises the category signal. If, at 208, the potential category signal is not found in the knowledge base, the potential category signal is determined not to be a category signal, at 210. For example, "Stinky", "Pete's" and "Stinky Pete's" are not likely to be found in a knowledge base comprising business entity categories (e.g., services, manufacturing, retail, etc.). Therefore, in this example, these potential category signals are determined not to be category signals.

Alternately, if the potential category signal is found in the knowledge base for the associated entity type (e.g., business names), at 208, the category signal can be replaced with a corresponding category descriptor from the knowledge base, at 212. For example, as illustrated in the exemplary embodiment 400 of FIG. 4, a first entity name 402 comprises "Stinky Pete's Bar and Grill." In a first decomposition 418A of the first entity name 402, a first potential category signal 406 "Stinky Pete's" may be determined not to comprise a category signal (e.g., does not match a business entity category). In this decomposition 418A, a second potential category signal 408 "Bar and Grill" matches a category signal that corresponds to a category descriptor "Restaurant.Bar" in the knowledge base.

Further, in this example 400, the category signal "Bar and Grill" 408 can be replaced with the category descriptor "Restaurant.Bar" in the first decomposition 418A of the first entity name 402. Therefore, the first decomposition 418A may comprise "Stinky Pete's" <Restaurant.Bar> <Null>, where the "Null" 410 term can identify a portion of the first entity name 402 found after the replaced category signal 408. In this example, the decomposed entity name 418A comprises a string, "Stinky Pete's", and a category descriptor <Restaurant.Bar>.

Returning to FIG. 2, at 212, in one embodiment, the entity name (e.g., 402 of FIG. 4) may be iterated through the exemplary method 200, such that one or more amended first entity names 250 are generated, and one or more amended second entity names 252 are generated. For example, as shown in the example 400 of FIG. 4, in a second decomposition 418B of the first entity name 402 the category signal "Bar" 408 can be replaced with the category descriptor <Restaurant.Bar>. In this example, the potential category signal "Bar" can be matched with the category signal "Bar" associated with category descriptor <Restaurant.Bar> in the knowledge base.

Further, in the example 400, in a third decomposition 418C of the first entity name 402 the category signal "Grill" 408 can be replaced with the category descriptor <Restaurant>; and can also be replaced with the category descriptor <Restaurant.Bar>, as shown in a fourth decomposition 418D of the first entity name 402.

A second entity name 404 comprises "Stnky Pete Lounge" (e.g., combining a misspelling and common variation of a business entity type). As an example, the second entity name 204 have been comprised in a blog or online user review, where the author used a variation of the actual business entity name (e.g., Stinky Pete's Bar and Grill). In one embodiment, the identification of multiple names for a same entity, such as a business, can be utilized to link the names together or merge them to a single name. For example, a user can search for a local eatery using an online search engine with mapping capability and find "Stinky Pete's Bar and Grill" (e.g., the first entity name 402). Further, in this example, the user may wish to find reviews or blog entries that discuss Stinky Pete's, such as to decide whether it meets the user's needs. A reviewer may list the entity as "Stnky Pete Lounge) (e.g., the second entity name). In this embodiment, these two entity names can be compared for matching to determine if they are for the same entity.

In the example 400, in a first decomposition 420A of the second entity name 404, "Stnky Pete" 412 is found not to be a category signal, and "Lounge" 414 is determined to comprise a category signal that is associated with the <Restaurant.Bar> category descriptor in the knowledge base. In this example 400, the category signal "Lounge" 414 can be replaced with the category descriptor <Restaurant.Bar> for the second entity name 404. Further, the <Null> term 416 is added to after the amended category descriptor 414.

In one embodiment, as shown in a fifth decomposition 418E of the first entity name 402, and a second decomposition 420B of the second entity name 404, a <No Category> category descriptor 408, 414 is amended for the first entity name 402 and second entity name 404 respectively. In this embodiment, the entity name (e.g., 402, 404) can be added to a set of category remainder pairs comprising a <No Category> category descriptor. The <No Category> category can be used for cases where the entity name is used in a casual manner.

For example, a reviewer, blog poster, or even a directory creator may merely refer to the business "Stinky Pete's Bar and Grill" as "Stinky Pete's;" much like customers and users may refer to "Starbucks Coffee" as "Starbucks." In this example, the casual reference can merely comprise the businesses' particular name (e.g., Stinky Pete's, or Starbucks) and not the category signal that links the particular name to a type of business for the entity (e.g., Bar and Grill, or Coffee). In this embodiment, the <No Category> category descriptor can be used a sort of "wild-card," for example, where the <No Category> can match a plurality of other category descriptors when matching entity names, as will be described in further detail below.

Figure 3:
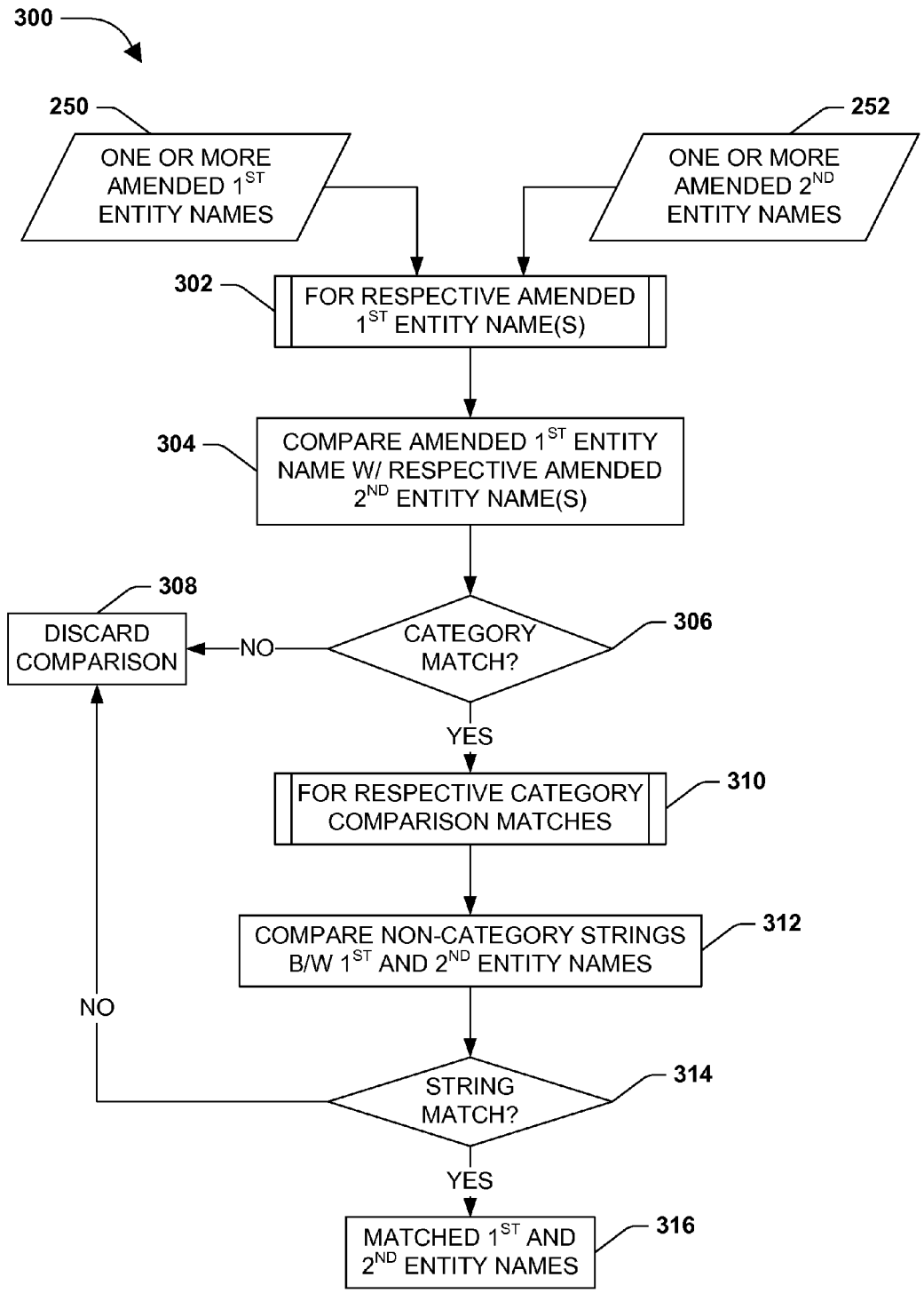
FIG. 3 is a flow diagram illustrating one embodiment of one or more techniques described herein.

FIG. 3 is a flow diagram illustrating one embodiment 300 of one or more techniques described herein. One or more amended first entity names 250 can be utilized for entity name matching; and one or more second entity names 250 can be utilized for the entity name matching. For example, as illustrated in FIG. 4, the amended first entity names can comprise: "Stinky Pete's" <Restaurant.Bar> <Null>; "Stinky Pete's" <Restaurant.Bar>"and Grill;" "Stinky Pete's Bar and" <Restaurant> <Null>; "Stinky Pete's Bar and" <Restaurant.Bar> <Null>; and "Stinky Pete's Bar and Grill" <No Category> <Null>. Further, the amended second entity names can comprise: "Stnky Pete" <Restaurant.Bar> <Null>; and "Stnky Pete Lounge" <No Category> <Null>.

At 302, for respective first entity names, the amended first entity name can be compared with the second entity names, at 304. That is, for example, "Stinky Pete's" <Restaurant.Bar> <Null> can be compared with both "Stnky Pete" <Restaurant.Bar> <Null>, and "Stnky Pete Lounge" <No Category> <Null>. In one embodiment, when comparing the entity names the respective category descriptors are compared between the first and second entity name. For example, the <Restaurant.Bar> of the amended first entity name "Stinky Pete's" <Restaurant.Bar> <Null> is compared to the <Restaurant.Bar> of the amended second entity name "Stnky Pete" <Restaurant.Bar> <Null>. In this example, the respective category descriptors provide an obvious match.

In one embodiment, comparing the first entity category descriptor amended to the first entity name with a second entity category descriptor amended to the second entity name can comprise determining a distance between the first entity category descriptor and the second entity category descriptor in a category tree. For example, a category knowledge base can be hierarchical, where the category Restaurant. Bar comprises a sub-category of the category Restaurant. In this example, a data structure tree can be used to represent the hierarchical relationship between the respective categories in the knowledge base, where respective categories (nodes) have at least one parent category (parent node) and zero or more sub-categories (children).

In one embodiment, a desired threshold (e.g., weighted tree metric) may be used to determine a "closeness" of the first and second entity category descriptors. That is, for example, if the relationship between the first entity name category and second entity name category falls within the threshold (e.g., number of hops, same parent, sub-category-category relationship, etc.), a match can be indicated. However, if the threshold is not met, a match for the categories is not indicated.

It will be appreciated that the category matching is not limited to the embodiments described herein, and it is anticipated that those skilled in the art may devise alternate comparison techniques. For example, the category knowledge-base can have an alternate structure, where one or more different metrics may be used to determine "closeness." In one embodiment, comparing the first entity category descriptor amended to the first entity name with the second entity category descriptor amended to the second entity name can comprise determining whether an entity type (e.g., determined by the category signal) can be comprised in both a first entity category of the first entity category descriptor and a second entity category of the second entity category descriptor.

For example, as illustrated in the example embodiment 500 of FIG. 5, in a first entity name 502 "Starbuck Coffee," a category signal 508 "Coffee" in a first decomposition 518A can be associated with the category "Restaurant.Coffee" in the knowledge base. However, in a second entity name 504 "Starbucks Towing" a category signal 514 "Towing" in a first decomposition 520A can be associated with a category "Services.Towing" in the knowledge base. In this embodiment, for example, because the respective category signals being compared cannot be found in a same category in the knowledge base (e.g., or sub-category), they may be determined as not matching (e.g., don't meet the threshold).

Returning to FIG. 3, at 306, if the category descriptors do not match, the comparison of the amended first entity name and the amended second entity name can be discarded, at 308, for example, and a next comparison can be performed, at 304. As described above, with reference to FIG. 5, an amended first entity name (as shown in the first decomposition 518A) comprises the category descriptor 508 <Restaurant.Coffee>, and an amended second entity name (as shown in the first decomposition 520A) comprises the category descriptor 514 <Services.Towing>. As an example, because these two category descriptors do not comprise a match, the comparison between this amended first entity name and this amended second entity name can be discarded (e.g., no further comparison is performed).

If the category descriptors do match, at 306, for the respective matched category descriptor pairs, at 310, the matching analysis between the first entity name and the second entity name can comprise comparing (non-category) string elements of the first entity name with (non-category) string elements of the second entity name, at 312. That is, for example, after confirming a match between the category descriptors for the amended first entity name and the amended second entity name additional comparison(s) can be performed.

In one embodiment, comparing the string elements of the first entity name with string elements of the second entity name can comprise comparing string elements that are not the category descriptor that has been amended into the entity name. For example, with reference to FIG. 4, the amended first entity name "Stinky Pete's" <Restaurant.Bar> <Null> comprises a first non-category descriptor string: "Stinky Pete's." Further, the amended second entity name "Stnky Pete" <Restaurant.Bar> <Null> comprises a first non-category descriptor string: "Stnky Pete." In this embodiment, for example, these string elements "Stinky Pete's" and "Stnky Pete" can be compared to determine a match.

In one embodiment, comparing string elements can comprise determining raw character distances between respective characters in the string elements of the first entity name and string elements of the second entity name. Further, in this embodiment, if the raw character distance meets a desired threshold, a match can be indicated between the string elements of the first entity name and string elements of the second entity name. For example, the string "Stinky Pete's," found in the first 418A and second 418B decompositions, is likely to meet a raw character distance desired threshold when compared to the string "Stnky Pete" found in the first decomposition 420A. Further, as an example, the strings found in the remaining amended first entity names, from the third 418C, fourth 418D and fifth 418E decompositions, may not meet the raw character distance desired threshold when compared to the string "Stnky Pete" found in the first decomposition 420A.

Returning to FIG. 3, at 314, if the non-category strings for the first and second entity names are determined to match (e.g., meet a desired threshold for character distance), the first and second entity names are determined to be a match, at 316, and may be linked together or merged in a directory, for example. However, if the non-category strings for the first and second entity names are determined not to match, the comparison is discarded, at 308, and a next comparison can be performed, if available, for example.

In one aspect, the "wildcard" <No Category> category descriptors can provide for a match between the category descriptors of the amended first entity name and amended second entity name. That is, for example, with reference to FIGS. 4 and 5, the "wildcard" <No Category> 408 of the fifth decomposition 418E for the first entity name 402 can match the category descriptor <Restaurant.Bar> 414 of the first decomposition 420A, and the <No Category> 414 of the second decomposition 420B, for the second entity name 404. Further, in the example 500, the "wildcard" <No Category> 508 of the second decomposition 518B for the first entity name 502 can match the category descriptor <Services.Towing> 514 of the first decomposition 520A, and the <No Category> 514 of the second decomposition 520B, for the second entity name 504.

Even though a match may be indicated for the category descriptors between the two amended entity names (e.g., YES at 306 of FIG. 3), the respective non-category strings are compared between the first and second amended entity names (e.g., at 312 of FIG. 3). If the non-category strings do not comprise a match (e.g., do not meet the desired threshold), the comparison is discarded (e.g., at 308 of FIG. 3). For example, as illustrated in the example 500, the non-category string 506 of the second decomposition 518B for the first entity name 502 can be compared to the non-category string 512 of the first decomposition 520A for the second entity name 504, and the raw character score may not meet the desired threshold (e.g., no match).

In one aspect, when a "wildcard" <No Category> category descriptor is used, there may be unintended instances where the non-category string provide a match between a first and second entity name, even if the categories for the entity type may not have normally provided a match. For example, as illustrated in the example embodiment 550 of FIG. 5B, a first entity name 552 "Starbucks" may be compared with a second entity name 554 "Starbucks Towing." In this example 550, a first decomposition 568A for the first entity name 552 comprises a non-category string 556 "Starbucks" and the wildcard <No Category> category descriptor 558.

Further, a first decomposition 570A for the second entity name 554 comprises a non-category string 562 "Starbucks" and a <Services.Towing> category descriptor 564. Because the "wildcard" 558 can provide a category match with <Services.Towing> category descriptor 564, the respective non-category strings are compared. Here, the non-category string "Starbucks" 556 for the first entity name matches the non-category string "Starbucks" 562 for the second entity name, the first and second entity names can be considered a match, and may be merged, for example. However, if the first entity name is linked to the well known coffee house, it probably should not be linked or merged with the second entity name that is linked to a towing service.

In this aspect, in one embodiment, the entity category descriptor can be amended to the entity name by adding the entity category descriptor to the entity name, where the entity category descriptor corresponds to the entity name in a knowledge base. For example, as illustrated in 550 of FIG. 5B, for well known or established entity names (e.g., trademarked names), a knowledge base may be used to identify an entity category descriptor for the entity. In a second decomposition 568B of 550, a category signal 558 "Coffee" is recognized for the first entity name "Starbucks" 552, and a corresponding category descriptor 558 in the knowledge base can be added to the entity name.

In this way, in this example, the category descriptor of the second decomposition 568B may not match the category descriptor 564 of the first decomposition 570A; and the non-category string 556 of the second decomposition 568B may not match the non-category string 562 of the second decomposition 570B for the second entity name 504. Therefore, in this example, by adding a category descriptor to the entity name (e.g., where merely a common name without a category signal is used), an unintended merging or linking of the entities may be mitigated.

That is, as an illustrative example, whenever a well known, well recognized entity name, such as Starbucks for coffee, or Midas for muffler service, is identified (e.g., matched in the knowledge base of recognizable and/or trademarked names) a corresponding category descriptor can be added to the entity name, thereby mitigating a potential for confusing the well known name with a similar entity from a different category. In this illustrative example, therefore, "Starbucks" can automatically become "Starbucks".<restaurant.coffee>, and/or "Midas" can automatically become "Midas".<services.auto.muffler>, for example.

Additionally, in this aspect, when the "wildcard" <No Category> category descriptor is used, there may be other unintended instances when the non-category string provides a match between a first and second entity name, even if the categories for the entity type may not have normally provided a match. For example, a potential entity name "Los Angeles Police Department" may comprise a match to "Los Angeles" when the <No Category> "wildcard" is utilized. In this example, "Los Angeles".<police dept> can match "Los Angeles".<no category>, which may be undesirable. Therefore, in one embodiment, some categories may be prevented from matching with the <no category> category descriptor. For example, municipal services, such as <police dept>, can be prevented from matching the <no category> category descriptor. Of course, this is not limited to municipal services as the technique is adaptable in other ways as well.

Figure 6:
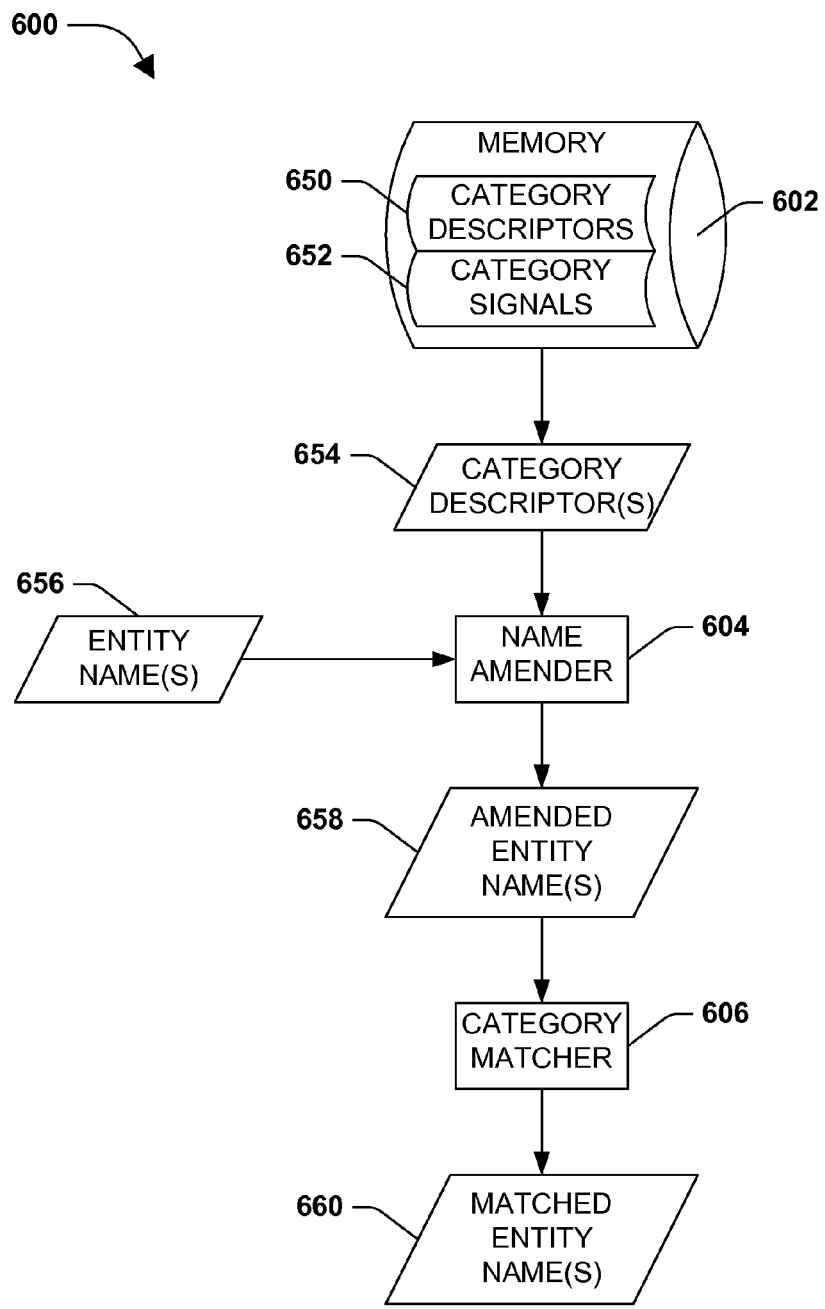
FIG. 6 is a component diagram of an exemplary system for matching entity names.

A system may be devised that provides for identifying multiple names for a same entity, so the multiple names may be linked together or merged to a single name, for example. FIG. 6 is a component diagram of an exemplary system 600 for matching entity names. A memory component 602 stores a knowledge base that comprises entity category descriptors 650 and associated category signals 652. That is, for example, the knowledge base in the memory component 602 may be queried to identify an unknown category descriptor 654 that is associated with a known category signal 652. As an example, the knowledge base may comprise a database, such as a two dimensional SQL database or multi-dimensional database.

A name amending component 604 is operably coupled with the memory component 602 to amend an entity name 656 with an entity category descriptor 654 from the knowledge base to produce an amended entity name 658. A category matching component 606 is operably coupled with the name amending component 604 to determine whether a first entity name matches a second entity name by comparing a first entity category descriptor in a first amended entity name 658 with a second entity category descriptor in a second amended entity name 658. In one embodiment, the category matching component 606 can identify matching entity names 660, such as to provide for merging or linking of the two names to a same entity, for example.

Figure 7:
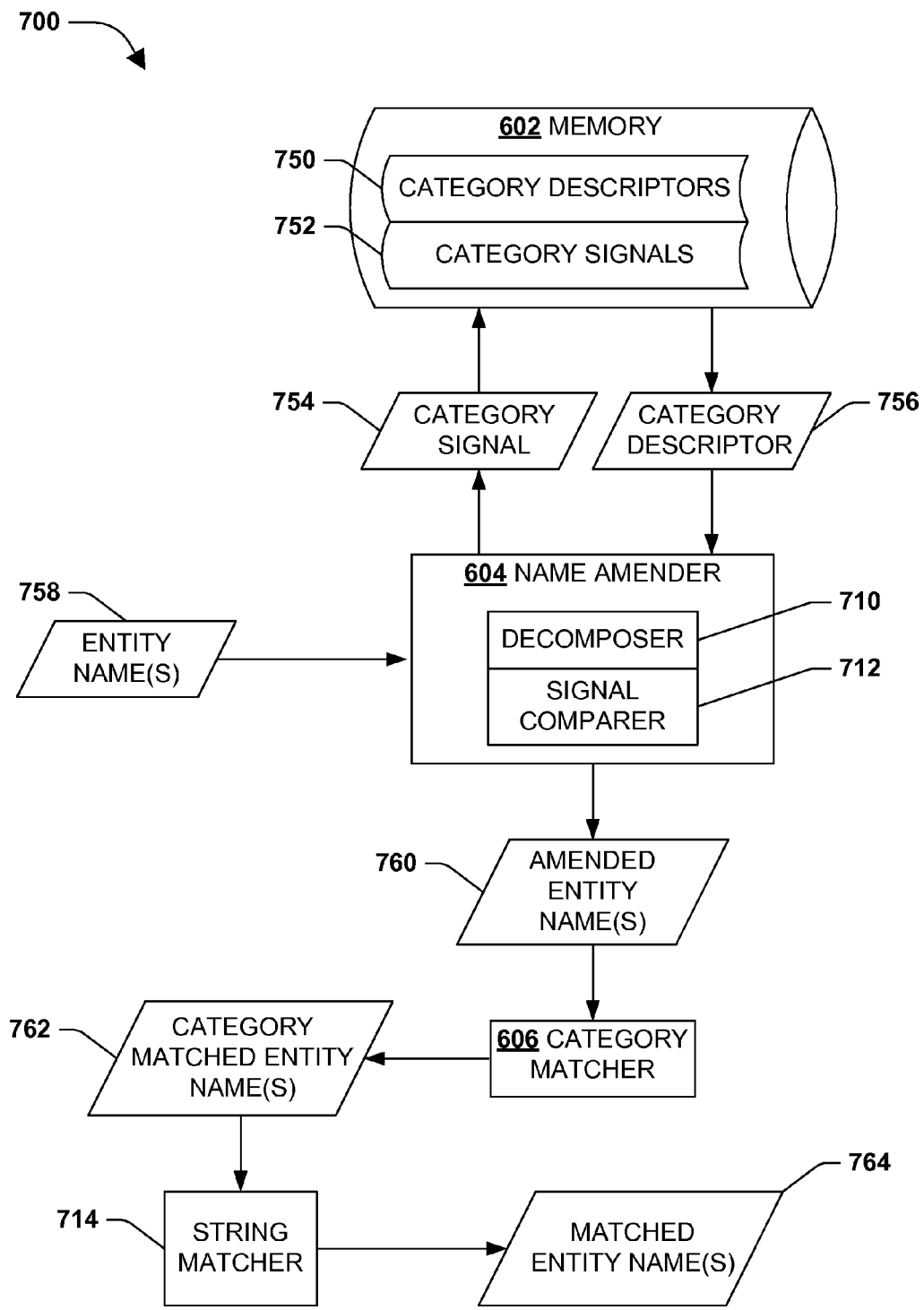
FIG. 7 is a component diagram illustrating one example embodiment of one or more systems described herein.

FIG. 7 is a component diagram illustrating one example embodiment 700 of one or more systems described herein. A string matching component 714 can determine whether the first entity name matches the second entity name by comparing string elements of the first entity name with string elements of the second entity name. In one embodiment, the string matching component 714 performs the string matching if the category matching component 606 identifies a match 762 from the amended entity names 760, and identifies matched entity names 764.

The name amending component 604 can comprise a decomposition component 710 that decomposes the entity name 758 into one or more potential category signals 754. Further, the name amending component 604 can comprise a signal comparison component 712 that compares respective category signals 754 against the knowledge base, in the memory component 602, comprising known category signals 754 to identify a corresponding category descriptor 756 for the category signal 754.

The knowledge base can comprise a plurality of entity category descriptors 750, where respective entity category descriptors 750 correspond to one or more category signals 752. That is, for example, the knowledge base can comprise a type of database, where the category descriptors 750 are linked/associated with one or more category signals 752.

In one embodiment, the category signal 754, 752 can comprise a business name that is known to be associated with the corresponding entity category descriptor 750, 756. That is, for example, a business name may be well known to be associated with a particular brand or business type (e.g., a trademarked entity). In this embodiment, the category signal can comprise the business name (e.g., Starbucks, Midas, Cabela's), such that the known business type associated with the name (e.g., coffee, mufflers, outfitters) can be a category descriptor linked/associated with the name in the knowledge base, for example. In this way, in this example, when the business name is compared against category signals 752 in the knowledge base, an associated category descriptor 750 can be identified, such as by the name amending component 604.

Figure 8:
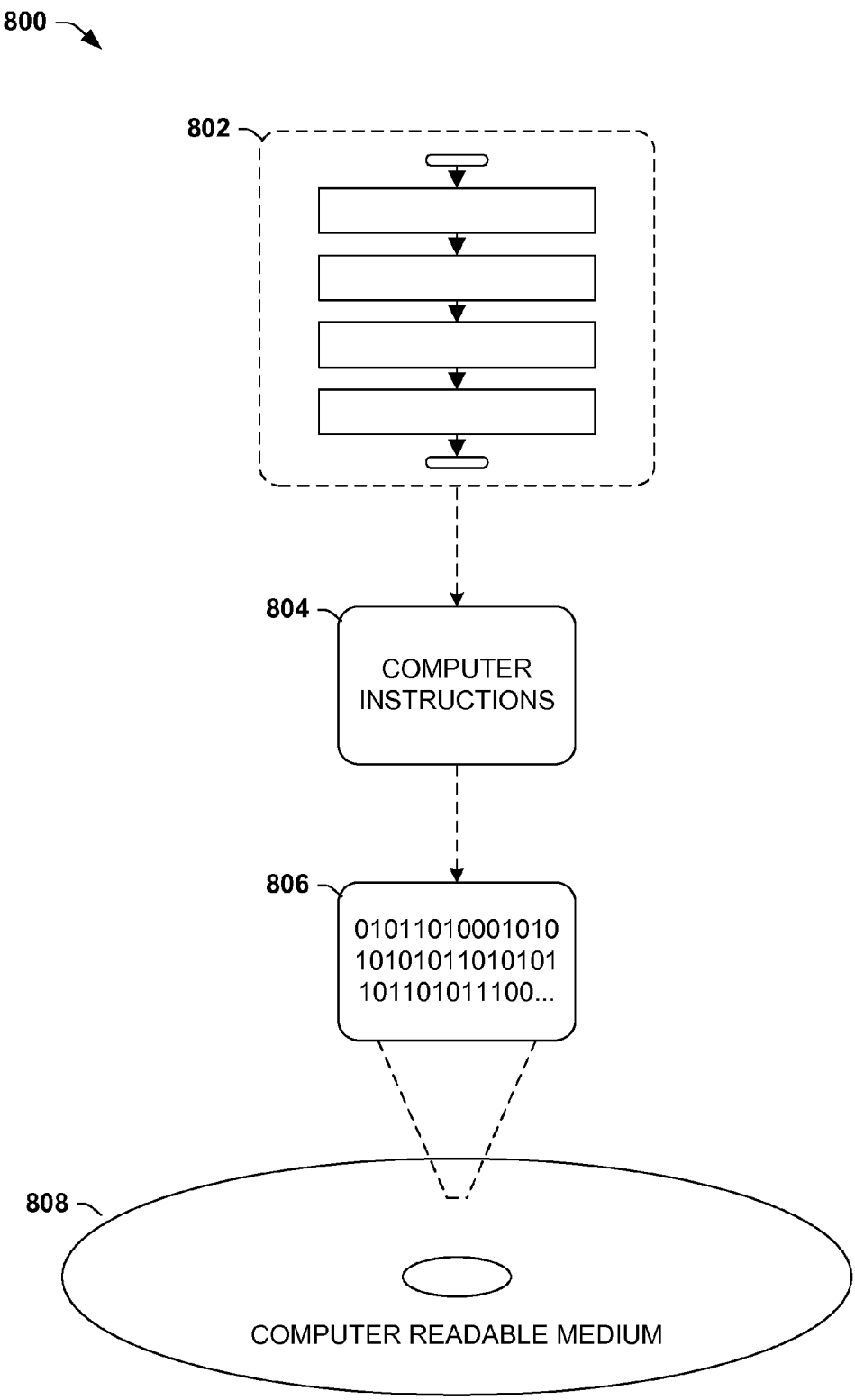
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 808 (e.g., a CD-R, DVD-R, or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as the exemplary method 100 of FIG. 1, for example. In another such embodiment, the processor-executable instructions 804 may be configured to implement a system, such as the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
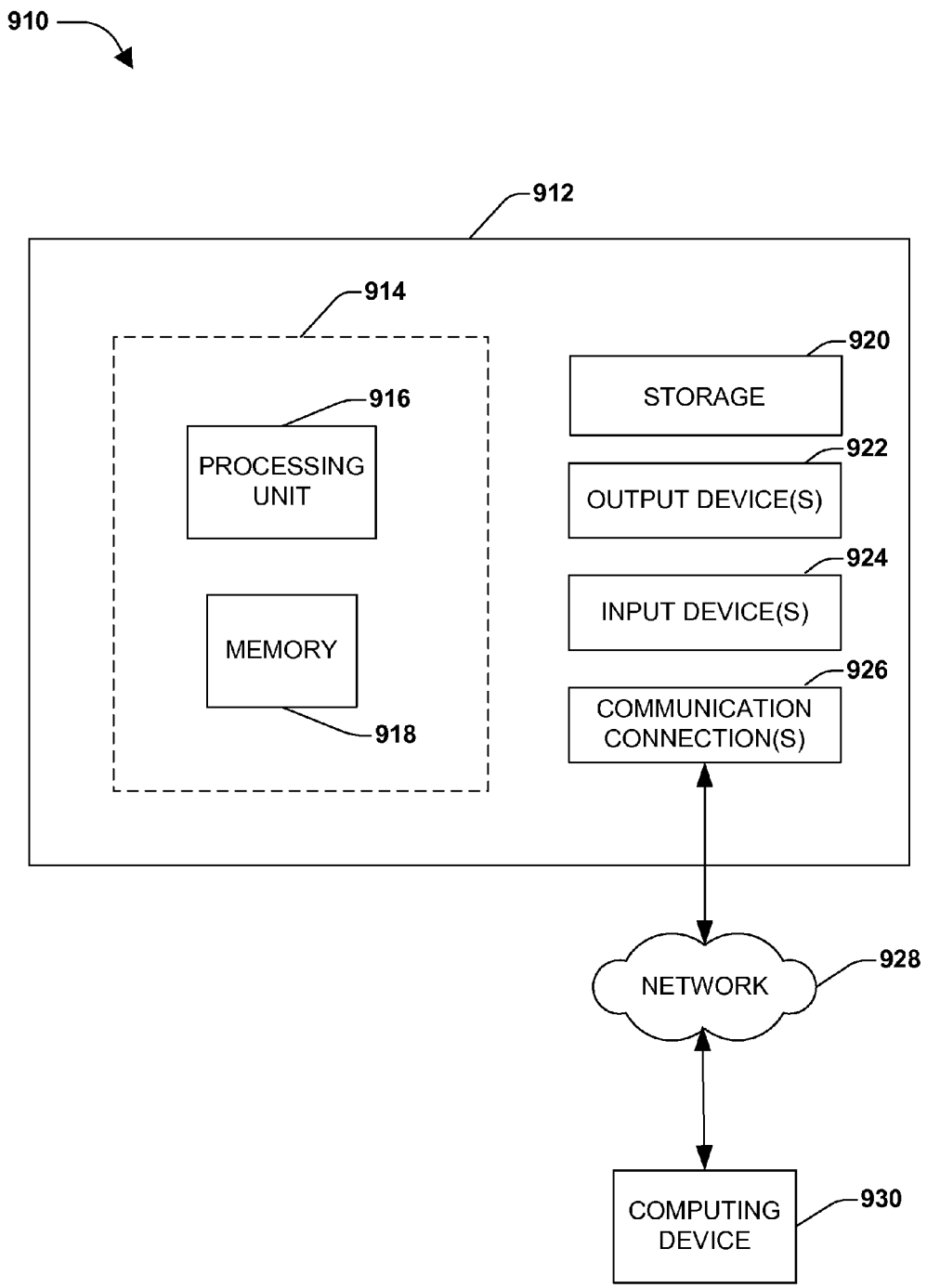
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for matching entity names, comprising:
    performing a matching analysis between a first entity name and a second entity name comprising comparing a first entity category descriptor amended to the first entity name with a second entity category descriptor amended to the second entity name, the first entity category descriptor amended to the first entity name comprising at least one of,
        the first entity category descriptor substituted for at least a portion of the first entity name, or
        the first entity category descriptor appended to the first entity name,
    at least some of the performing a matching analysis implemented at least in part via a processing unit.

2. The method of claim 1, comprising one or more of:
    amending the first entity category descriptor to the first entity name; or
    amending the second entity category descriptor to the second entity name.

3. The method of claim 1, comprising:
    decomposing the first entity name to identify a category signal; and
    comparing the category signal against a knowledge base of known category signals to identify the first entity category descriptor.

4. The method of claim 3, comprising:
    amending the first entity category descriptor to the first entity name comprising replacing the category signal in the decomposed first entity name with the first entity category descriptor.

5. The method of claim 3:
    the first entity name comprising a business entity name;
    the first entity category descriptor comprising a business type category; and
    the category signal comprising a string that is descriptive of a business in the business type category.

6. The method of claim 1, the comparing a first entity category descriptor amended to the first entity name with a second entity category descriptor amended to the second entity name comprising:
    determining a distance between the first entity category descriptor and the second entity category descriptor in a category tree.

7. The method of claim 6, comprising:
    identifying a match between the first entity category descriptor and the second entity category descriptor if the distance between the first entity category descriptor and the second entity category descriptor in a category tree meets a desired threshold.

8. The method of claim 1, the comparing a first entity category descriptor amended to the first entity name with a second entity category descriptor amended to the second entity name comprising:
    determining whether an entity type can be comprised in both a first entity category of the first entity category descriptor and a second entity category of the second entity category descriptor.

9. The method of claim 1, the performing a matching analysis between a first entity name and a second entity name comprising:
    comparing string elements of the first entity name with string elements of the second entity name.

10. The method of claim 9, the comparing string elements of the first entity name with string elements of the second entity name comprising:
    comparing string elements of the first entity name that are not part of the first entity category descriptor with string elements of the second entity name that are not part of the second entity category descriptor.

11. The method of claim 9, the comparing string elements of the first entity name with string elements of the second entity name comprising:
    comparing string elements of the first entity name with string elements of the second entity name if a match is identified between the first entity category descriptor and the second entity category descriptor.

12. The method of claim 9, the comparing string elements of the first entity name with string elements of the second entity name comprising:
    determining a raw character distance between respective characters in the string elements of the first entity name and string elements of the second entity name; and
    identifying a match between the string elements of the first entity name and string elements of the second entity name if the raw character distance meets a desired threshold.

13. The method of claim 1, comprising:
    amending one or more of the first entity name or the and second entity name by adding a no-category descriptor, the no-category descriptor comprising a wild-card.

14. The method of claim 1, the first entity category descriptor amended to the first entity name corresponding to an entity name in a knowledge base.

15. A system for matching entity names, comprising:
    a memory component configured to store a knowledge base comprising entity category descriptors and associated category signals;
    a name amending component operably coupled with the memory component, and configured to amend an entity name with an entity category descriptor from the knowledge base, amending the entity name with the entity category descriptor comprising at least one of:
  substituting the entity category descriptor for at least a portion of the entity name or
  appending the entity category descriptor to the entity name; and
a category matching component operably coupled with the name amending component, and configured to determine whether a first entity name matches a second entity name by comparing a first entity category descriptor amended to the first entity name with a second entity category descriptor amended to the second amended entity name.

16. The system of claim 15, comprising:
a string matching component configured to determine whether the first entity name matches the second entity name by comparing string elements of the first entity name with string elements of the second entity name, if the category matching component identifies a match between the first entity category descriptor and the second entity category descriptor.

17. The system of claim 15, respective entity category descriptors stored in the knowledge base corresponding to one or more category signals.

18. The system of claim 17, a first of the one or more category signals comprising a business name that is known to be associated with a first of the entity category descriptors stored in the knowledge base.

19. The system of claim 15, the name amending component comprising:
  a decomposition component configured to decompose the first entity name into one or more potential category signals; and
  a signal comparison component configured to compare respective category signals of the decomposed first entity name against the knowledge base comprising known category signals to identify the first entity category descriptor.

20. A computer readable medium comprising computer executable instructions that when executed via a processing unit perform a method, comprising:
  performing a matching analysis between a first entity name and a second entity name comprising comparing a first entity category descriptor amended to the first entity name with a second entity category descriptor amended to the second entity name, the first entity category descriptor amended to the first entity name comprising at least one of:
    the first entity category descriptor substituted for at least a portion of the first entity name, or
    the first entity category descriptor appended to the first entity name.

* * * * *